(12) United States Patent
Hippalgaonkar et al.

(10) Patent No.: US 9,709,164 B2
(45) Date of Patent: Jul. 18, 2017

(54) TRANSMISSION COMPONENT FAILURE DETECTION AND AVOIDANCE

(71) Applicant: Ford Global Technologies, LLC, Dearborn, MI (US)

(72) Inventors: Rohit Hippalgaonkar, Livonia, MI (US); Eric Hongtei Tseng, Canton, MI (US); Yuji Fujii, Ann Arbor, MI (US); Gregory Michael Pietron, Canton, MI (US); James William Loch McCallum, Ann Arbor, MI (US); Jason Meyer, Canton, MI (US); Michael John Leads, Farmington Hills, MI (US); Joseph F. Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 14/668,062

(22) Filed: Mar. 25, 2015

(65) Prior Publication Data

US 2016/0281846 A1    Sep. 29, 2016

(51) Int. Cl.
*F16H 61/12* (2010.01)
*F16H 59/14* (2006.01)
*F16H 61/00* (2006.01)

(52) U.S. Cl.
CPC .............. *F16H 61/12* (2013.01); *F16H 59/14* (2013.01); *F16H 2059/147* (2013.01); *F16H 2059/148* (2013.01); *F16H 2061/0087* (2013.01); *F16H 2061/0093* (2013.01); *F16H 2061/124* (2013.01); *F16H 2061/1276* (2013.01)

(58) Field of Classification Search
None
See application file for complete search history.

(56) References Cited

U.S. PATENT DOCUMENTS

| 6,173,226 | B1 * | 1/2001 | Yoshida | ............... B60W 10/06 477/105 |
| 7,145,442 | B1 | 12/2006 | Wai | |

(Continued)

OTHER PUBLICATIONS http://www.fev.com_fileadmin_user_upload_Media_EngineeringServices_CalibrationMethods_186_TecInfo_TOPexpert_Trace_Transmission_Calibration_Expert.pdf, Sep. 30, 2011, 1 page.

(Continued)

*Primary Examiner* — Edwin A Young
(74) *Attorney, Agent, or Firm* — James Dottavio; Brooks Kushman P.C.

(57) ABSTRACT

A method of operating a transmission includes measuring an output torque, estimating a gearbox input torque using a model, and estimating gearbox component torques based on a detailed gearbox model. The model used to estimate the input torque varies depending on whether a torque converter is locked, open, or slipping. In some operating conditions, multiple estimates are available for gearbox input torque, impeller torque, or shift element torque in which case the models are adapted. When an estimated component torque is outside an expected range, a warning flag is raised and diagnostic data is saved. When an estimated torque approaches or exceeds a torque limit, the input torque command may be reduced to prevent component damage. A warning flag may also be raised and diagnostic data saved in response to a model parameter being adapted to a value outside of a predetermined range.

23 Claims, 10 Drawing Sheets

(56) References Cited

U.S. PATENT DOCUMENTS

| | | | |
|---|---|---|---|
| 7,644,812 | B2 | 1/2010 | Simpson et al. |
| 8,255,130 | B2 | 8/2012 | Fujii et al. |
| 8,510,003 | B2 | 8/2013 | Yanakiev et al. |
| 8,706,369 | B2 | 4/2014 | Yanakiev et al. |
| 2006/0154781 | A1* | 7/2006 | Petzold .................. F16D 48/06 477/80 |
| 2012/0316738 | A1* | 12/2012 | Teslak .................... F16H 59/16 701/53 |
| 2013/0345022 | A1 | 12/2013 | Yanakiev et al. |

OTHER PUBLICATIONS www.testing-expo.com__usa__08conf_pdfs_day_1_12_AVL_ Gianluca%20Vitale.pdf, Oct. 22, 2008, 17 pages.

\* cited by examiner

TRANSMISSION COMPONENT FAILURE DETECTION AND AVOIDANCE

TECHNICAL FIELD

This disclosure relates to the field of vehicle controls. More particularly, the disclosure pertains to a method of mitigating transmission component damage based on component torque estimation.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as clutches and brakes. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction clutches or brakes. The controller regulates the torque capacity of the shift element by regulating an electrical current to a solenoid, which adjusts a force on a valve which, in turn, adjusts a pressure in a hydraulic circuit.

Most transmissions are equipped with a launch device. When the vehicle is stationary or moving very slowly, the gearbox input speed is less than the minimum operating speed of the engine. A launch device transmits torque from the engine to the gearbox input while permitting the engine to rotate at an acceptable speed. A common launch device is a torque converter which includes an impeller driven by the engine and a turbine driving the gearbox input. Torque is transferred from the impeller to the turbine hydro-dynamically. Many torque converters also include a hydraulically controlled lock-up clutch that couples the impeller to the turbine, bypassing the hydro-dynamic power transfer path to improve efficiency at higher vehicle speeds. Other transmissions use an actively controlled launch clutch as a launch device.

A modern automatic transmission is controlled by a microprocessor which adjusts the torque capacity of each shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible.

SUMMARY OF THE DISCLOSURE

In a first embodiment, a method of operating a transmission includes estimating a component torque during a shift event and setting an error flag in response to the component torque being outside an expected range. The component may be a gear or a shift element, such as a brake or a clutch. The expected range may be predetermined or may be computed based, for example, on a measured, estimated, or commanded torque value. The component torque is estimated during the shift event by measuring a gearbox output torque, estimating a gearbox input torque using a first model, and estimating the component torque based on the measured output torque and estimated input torque using a second model. The first model may be an engine model, a torque converter model, a lockup clutch model, or a combination of the above. The second model may be a detailed gearbox model based on torque relationships for gears and shift elements.

In a second embodiment, a method of operating a transmission includes calculating two estimates of a transmission component torque while operating in a fixed ratio, adapting a parameter of one of the models in response to the component torque estimates differing, and setting an error flag in response to the parameter being outside a predetermined range. The transmission component torque may be, for example, a gearbox input torque, an impeller torque, or a lockup clutch torque. The models may include an engine model, a torque converter model, a gearbox aggregate loss model, and a lockup clutch model. The method may also store diagnostic data in response to the parameter being outside the predetermined range.

In a third embodiment, a method of operating a transmission includes adapting an aggregate loss model between shift events, estimating gearbox component torques using a detailed gearbox model during shift events, and adapting the detailed gearbox model using the adapted aggregate gearbox loss model. Changes to detailed gearbox model parameters during adaptation may result in setting a warning flag.

DETAILED DESCRIPTION

Figure 1:
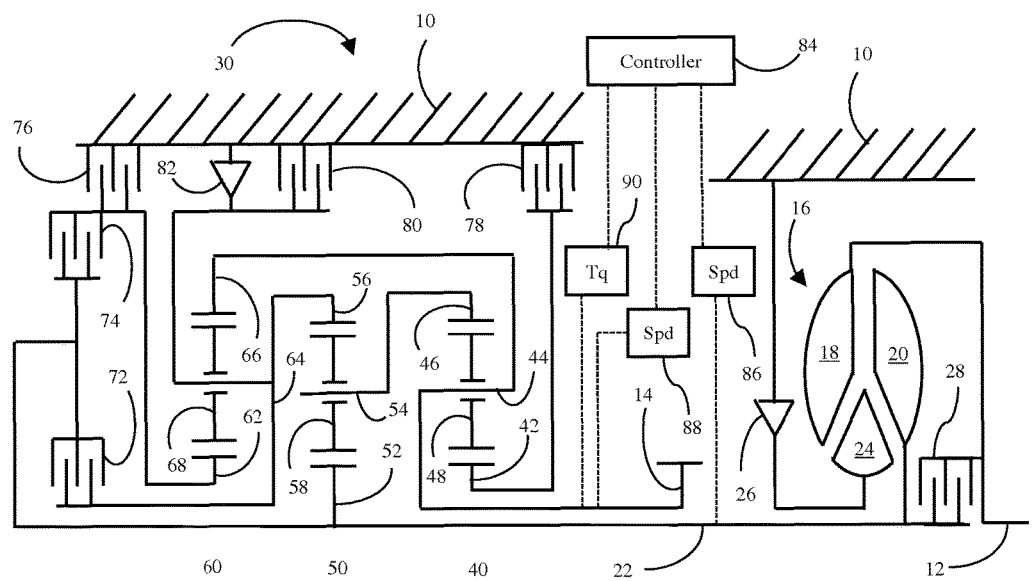
FIG. 1 is a schematic representation of a transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimension. However, the actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms. A proportional term (p term) is proportional to the error, a derivative term (d term) is proportional to the derivative of the error, and an integral term (i term) is proportional to an integral of the error. Each closed loop term has a coefficient of proportionality. These coefficients are set during calibration such that, despite the presence of noise factors, the result converges rapidly toward the desired behavior with minimal oscillation.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate.

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

A number of models will be discussed with reference to a particular transmission layout. Methods of utilizing these models to estimate unmeasured parameters are discussed with reference to a particular collection of available sensor readings. Finally, methods of adapting the models are discussed. Although the discussion references a particular transmission layout and sensor array, a person of skill in the art may apply the methods discussed to different transmission layouts and sensor arrays.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 46 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|         | 72 | 74 | 76 | 78 | 80/82 | Ratio  | Step |
|---------|----|----|----|----|-------|--------|------|
| Reverse |    | X  |    |    | X     | -3.00  | 71%  |
| 1st     |    |    |    | X  | X     | 4.20   |      |
| 2nd     |    |    | X  | X  |       | 2.70   | 1.56 |
| 3rd     |    | X  |    | X  |       | 1.80   | 1.50 |
| 4th     | X  |    |    | X  |       | 1.40   | 1.29 |
| 5th     | X  | X  |    |    |       | 1.00   | 1.40 |
| 6th     | X  |    | X  |    |       | 0.75   | 1.33 |

Shift elements 72-80 may be hydraulically actuated multi-plate wet friction clutches or brakes. Controller 84 controls the pressure of transmission fluid routed to each shift element. This controller may adjust an electrical current to one or more variable force solenoids to control the pressure supplied to each clutch. When pressurized fluid is first supplied to a shift element, it moves a piston into a stroked position. Then, the piston forces the plates together causing the shift element to transmit torque. The torque capacity is negligible until the piston reaches the stroked position. Once the piston reaches the stroked position, the torque capacity increases approximately linearly with the fluid pressure. When the pressure is relieved, a return spring moves the piston to a released (not stroked) position. The controller receives signals from a turbine speed sensor 86, an output speed sensor 88, and an output torque sensor 90.

In order to estimate the speeds of particular elements and the torques on particular elements to the values measured by sensors 86-90, models are needed. Such models may be derived based on the speed and torque relationships of each of the components disregarding any parasitic power losses. If a group of components that are fixed coupled to one another is modeled as a rigid element, then the sum of the torques exerted on that group, called a shaft, is proportional to the rotational acceleration of the shaft. The coefficient of proportionality is called the rotational moment of inertia, J, which can be estimated based on the dimensions and material density or can be measured experimentally.

$$\Sigma\tau = Ja$$

Gearbox 30 of FIG. 1 has 6 such shafts: turbine shaft 22 and sun 52; sun 42; output 14, carrier 44, and ring 66; carrier 54 and ring 46; carrier 64 and ring 56; and sun 62.

Disregarding parasitic losses, the speeds of the elements of a planetary gear set and their relative torques are related to the number of teeth on the sun gear, $N_{sun}$, and the number of teeth on the ring gear, $N_{ring}$. Specifically, for a simple planetary gear set, $$N_{sun}\omega_{sun} + N_{ring}\omega_{ring} = (N_{sun} + N_{ring})\omega_{carrier}$$

$$N_{ring}\tau_{sun} = N_{sun}\tau_{ring}$$

$$\tau_{sun} + \tau_{carrier} + \tau_{ring} = 0$$

For a double-pinion planetary gear set, $$N_{ring}\omega_{ring} - N_{sun}\omega_{sun} = (N_{ring} - N_{sun})\omega_{carrier}$$

$$N_{ring}\tau_{sun} = -N_{sun}\tau_{ring}$$

$$\tau_{sun} + \tau_{carrier} + \tau_{ring} = 0$$

A friction clutch selectively couples two elements, called the hub and the shell. In the examples herein, the top edge of the clutch symbol in FIG. 1 will be treated as the shell and the bottom edge of the symbol will be treated as the hub, although the choice is arbitrary. The torques applied to each element are a function of the clutch torque capacity, $\tau_{cap}$, and relative speeds of the elements. Specifically, $$\begin{cases} \tau_{hub} = \tau_{cap} \text{ if } \omega_{hub} < \omega_{shell} \\ \text{abs}(\tau_{hub}) <= \tau_{cap} \text{ if } \omega_{hub} = \omega_{shell} \\ \tau_{hub} = -\tau_{cap} \text{ if } \omega_{hub} > \omega_{shell} \end{cases}$$

$$\tau_{hub} + \tau_{shell} = 0$$

Disregarding parasitic losses, the torque capacity of a released clutch is zero.

For gearbox 30 in FIG. 1, each of the three planetary gear sets provide one equation relating the speeds of the six shafts. When the gearbox is engaged in a particular gear ratio (not shifting), the two engaged clutches each provide one equation relating the speeds of the shafts. With six shafts and five equations, we must have one measured speed in order to be able to calculate all of the speeds. This additional speed could be provided by turbine speed sensor 86 or by output speed sensor 88. For example when third gear is engaged (clutch 74 and brake 78 engaged), the speeds of the six shafts can be determined by simultaneously solving the six equations:

$$N_{42}\omega_{42} + N_{46}\omega_{46,54} = (N_{42} + N_{46})\omega_{14,44,66} \text{ (from gear set 40)}$$

$$N_{52}\omega_{22,52} + N_{56}\omega_{56,64} = (N_{52} + N_{56})\omega_{46,54} \text{ (from gear set 50)}$$

$$N_{62}\omega_{62} + N_{66}\omega_{14,44,66} = (N_{62} + N_{66})\omega_{56,64} \text{ (from gear set 60)}$$

$$\omega_{22,52} = \omega_{62} \text{ (from clutch 74 being engaged)}$$

$$\omega_{42} = 0 \text{ (from brake 78 being engaged)}$$

$$\omega_{14,44,66} = \text{measured}$$

The second speed sensor may be used to confirm that third gear is in fact engaged. Each speed is proportional to the measured speed. The equations can be solved in advance to find the coefficient of proportionality for each shaft for each gear ratio.

For gearbox 30, there are 21 element torques to be calculated, three for each planetary gear set, two for each clutch, plus the input torque and the output torque. Each of the three planetary gear sets provides two torque equations. Each of the five shift elements provides one torque equation. Each of the six shafts provides one torque equation. (By convention, output torque is defined as the torque exerted by the gearbox on the output, whereas other torques are defined as the torque exerted by the component on the shaft. Therefore, output torque appears on the opposite side of the shaft torque equation from component torques.) Each shaft equation requires the shaft acceleration which is determined by numerically differentiating the shaft speed. Collectively, this provides 17 torque equations. When the gearbox is engaged in a particular gear ratio, the three disengaged clutches each provide an additional torque equation. Therefore, one sensed torque is required, which is provided by torque sensor 90. For example when third gear is engaged, the torques can be determined by simultaneously solving the 21 equations:

$$N_{46}\tau_{42}=N_{42}\tau_{46}$$

$$\tau_{42}+\tau_{44}+\tau_{46}=0$$

$$N_{56}\tau_{52}=N_{52}\tau_{56}$$

$$\tau_{52}+\tau_{54}+\tau_{56}=0$$

$$N_{66}\tau_{62}=N_{62}\tau_{66}$$

$$\tau_{62}+\tau_{64}+\tau_{66}=0$$

$$\tau_{hub\ 72}+\tau_{shell\ 72}=0$$

$$\tau_{hub\ 74}+\tau_{shell\ 74}=0$$

$$\tau_{hub\ 76}+\tau_{shell\ 76}=0$$

$$\tau_{hub\ 78}+\tau_{shell\ 78}=0$$

$$\tau_{hub\ 80}+\tau_{shell\ 80}=0$$

$$\tau_{input}+\tau_{22}+\tau_{shell\ 72}+\tau_{hub\ 74}=J_{22,52}a_{22,52}$$

$$\tau_{42}+\tau_{hub\ 78}=J_{42}a_{42}$$

$$\tau_{44}+\tau_{66}=\tau_{output}+J_{14,44,66}a_{14,44,66}$$

$$\tau_{46}+\tau_{54}=J_{46,54}a_{46,54}$$

$$\tau_{56}+\tau_{64}+\tau_{hub\ 72}+\tau_{hub\ 80}=J_{56,64}a_{56,64}$$

$$\tau_{62}+\tau_{shell\ 74}+\tau_{hub\ 76}=J_{62}a_{62}$$

$$\tau_{hub\ 72}=0 \text{ (from clutch 72 being disengaged)}$$

$$\tau_{hub\ 76}=0 \text{ (from brake 76 being disengaged)}$$

$$\tau_{hub\ 80}=0 \text{ (from brake 80 being disengaged)}$$

$$\tau_{output}=\text{measured}$$

These equations can be manipulated such that each torque is expressed as a sum of two terms, one term proportional to the measured torque and the other proportional to the measured acceleration. The coefficients of proportionality can be determined in advance for each gear ratio. The hub and shell torque of the applied shift elements, 74 and 78 in this example, indicate a lower limit on the respective shift element torque capacity. However, the actual torque capacity cannot be determined using this model.

The above model disregards parasitic losses. However, the model can be modified to account for some types of parasitic losses. For example, a disengaged shift element does not necessarily have zero torque capacity. This type of parasitic drag can be accounted for in the model by calculating the torque capacity of disengaged clutches as a function of the speeds of the hub and the shell, or as a function of the speed difference. Windage losses can be accounted for by adding a windage term in each shaft torque equation where the windage term is a function of the shaft speed. Mesh efficiency can be accounted for by slightly increasing or decreasing the tooth counts in the equation that relates the sun gear torque to the ring torque. Whether the tooth count is increased or decreased depends on the relative speeds and the direction of the torque. When losses are modeled this way, the individual component torques can still be computed based on a single measured speed and a single measured torque, although it may not be possible to pre-simplify the equations.

An alternative approach to modeling parasitic losses is to model the aggregate losses of the gearbox. The aggregate power loss of the gearbox may be tabulated as a function of the measured speed and measured torque and possible other factors such as fluid temperature. This table may be populated empirically using a dynamometer, using detailed component models, or some combination of the two. One disadvantage of using an aggregate loss model is that it is not as amenable to calculating individual component torques as a detailed component by component loss model.

During a shift between ratios, the calculations of component torque must be modified. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element is gradually reduced and the torque capacity of the on-coming shift element is gradually increased. During this phase, there is little or no slip across the off-going shift element but considerable slip across the on-coming shift element. When the off-going shift element torque capacity reaches zero, the power flow path associated with the upshifted gear is established. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the inertia phase, the torque capacity of the on-coming shift element is gradually increased while the torque capacity of the off-going element is reduced to zero.

During the shift, neither the on-coming nor the off-going shift element can be assumed to have zero slip. Although it may be intended for the off-going shift element to have zero slip during the torque phase of an upshift and for the on-coming shift element to have zero slip during the torque phase of a downshift, the controller cannot assume this to be the case. Therefore, one of the component speed equations that is used when the transmission is in a fixed gear is not available during the shift. Consequently, both speed sensors 86 and 88 contribute speed equations. In some shifts, more than one clutch is released and more than one clutch is engaged. In such shifts, more than two shafts speeds must be determined with sensors.

Similarly, during the shift, neither the on-coming nor the off-going shift element can be assumed to have zero torque capacity. Although it may be intended for the on-coming shift element to have zero torque capacity during the preparatory phase of an upshift and during the inertia phase of a downshift, the controller cannot assume this to be the case. Sometimes, the pressure intended to merely stroke the piston actually causes a torque capacity increase. Therefore, one of the component torque equations that is used when the transmission is in a fixed gear is not available during the shift. If the transmission is not equipped with a second torque sensor, then a model may be used to estimate the input torque to provide the additional component torque equation.

$$\tau_{input} = \tau_{turbine} + \tau_{hub\ 28}$$

When torque converter lock-up clutch 28 is disengaged, the torque at the hub of lock-up clutch 28 is zero. Therefore, a model of the torque converter can provide the additional torque estimate needed during shifting. For a particular torque converter geometry (diameter, blade angles, etc), the hydro-dynamic torques exerted on the torque converter elements are functions of the turbine speed and the impeller speed. Environmental factors, such as fluid temperature, may also impact the relationship to some degree. A suitable torque converter model is described in U.S. Patent Publication 2013/0345022 which is hereby incorporated by reference herein. Specifically, $$\tau_{impeller} = f1(\omega_{impeller}/\omega_{turbine}, temp, \ldots)\omega_{impeller}^2$$

$$\tau_{turbine} = f2(\omega_{impeller}/\omega_{turbine}, temp, \ldots)\omega_{impeller}^2$$

$$\tau_{turbine} + \tau_{impeller} + \tau_{stator} = 0$$

The functions f1 and f2 can be determined experimentally and stored by the controller as tables. The turbine speed is directly measured using sensor 86. The impeller speed is equal to the engine crankshaft speed and can be obtained using a third speed sensor or by communication with an engine controller.

When lock-up clutch 28 is engaged, on the other hand, a model of the engine torque can provide the additional torque estimate needed during shifting. The transmission controller may obtain the current engine torque estimate by requesting it from the engine controller which maintains an engine torque model. Specifically, $$\tau_{engine} + \tau_{impeller} + \tau_{shell\ 28} = J_{12} a_{12}$$

When lock-up clutch 28 is fully engaged, the impeller torque is zero. When the lock-up clutch is slipping, the hydro-dynamic model above may be used to estimate the impeller torque.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the valve body. A valve in the valve body responds by adjusting the pressure in a fluid circuit in proportion to the force generated by the solenoid. The fluid is routed to a clutch apply chamber where it pushes a piston to compress a clutch pack with interleaved friction plates and separator plates. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is zero. Beyond the current required to overcome the return spring, the torque capacity increases linearly with respect to the current. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. A dynamic model of the hydraulically actuated shift element may account for the time delay while the piston moves from the released position to the stroked position.

At each time step, the controller determines a desired torque capacity for each shift element and then determines what electric current to command to the corresponding solenoid using the shift element model. This open loop control method, however, is subject to inaccuracy due to various noise factors. When a torque capacity estimate based on a measurement is available, the inaccuracies can be reduced using closed loop terms. When a clutch is slipping, such as the on-coming element in an upshift torque phase or the off-going element in a downshift torque phase, the gearbox model described above provides such an estimate. Furthermore, the estimated torque capacity can be used to adaptively revise the shift element model. Consequently, control is improved even when the shift element is not slipping, such as the off-going element in an upshift or the on-coming element in a downshift.

When the transmission is in a fixed gear ratio, there are multiple models which predict gearbox input torque. This provides an opportunity to adaptively refine one or both models. One estimate is produced by the gearbox model in combination with a torque sensor reading and a speed sensor reading. This model may include component parasitic loss models or an aggregate parasitic loss model. When lock-up clutch 28 is fully engaged, a second gearbox input torque estimate is based on an engine model. If the estimates differ, the engine model may be modified to bring that estimate closer to the gearbox based estimate. Alternatively, or additionally, the aggregate gearbox loss model may be modified to bring the gearbox based estimate closer to the engine model based estimate. Similarly, when lock-up clutch 28 is disengaged, a second gearbox input torque estimate is based on a torque converter model. If the estimates differ, the torque converter model, the aggregate gearbox loss model, or both may be modified to bring the estimates closer together. Also, when lock-up clutch 28 is disengaged, both the engine model and the torque converter model estimate impeller torque. If these two estimates differ, one or both models may be modified to bring the estimates closer together.

Several of the models described above can be represented in controller 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, the aggregate gearbox loss model for 3rd gear may be represented as a three dimensional lookup table based on gearbox input torque, gearbox input speed, and temperature. If the model includes multiple output variables, it may be represented by multiple lookup tables. For example, the torque converter model may have one lookup table for impeller torque and another lookup table for turbine torque.

To find a value for a model output variable based on particular values of the model input variables, the controller finds the stored points that are closest to the particular values and then interpolates. For example, to find the predicted gearbox losses at 1200 rpm input speed and 75 Nm input torque, the controller may interpolate between the stored loss values at (1000 rpm, 70 Nm), (1500 rpm, 70 Nm), (1000 rpm, 80 Nm), and (1500 rpm, 80 Nm). To find an input variable corresponding to a desired output variable, reverse interpolation is used. For example, to find the open loop pressure command for a desired clutch torque capacity of 95 Nm, the controller may interpolate between a stored point that yields 92 Nm and a stored point that yields 96 Nm. This reverse interpolation yields a unique solution only when the underlying function is monotonic. Alternatively, the model may be re-formulated such that torque capacity is an input variable and commanded pressure is an output variable.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. In the example above, stored gearbox loss estimates at (1000 rpm, 70 Nm), (1500 rpm, 70 Nm), (1000 rpm, 80 Nm), and (1500 rpm, 80 Nm) were used to predict gearbox losses at 1200 rpm input speed and 75 Nm input torque. If the interpolation yields an estimate of 1.5 Nm of loss and the observed loss is 2.5 Nm, those four stored values might each be increased by 0.2 Nm such that a new estimate at the same operating point would be 1.7 Nm. For stability, the adaptation is not allowed to change the stored values by too much at once. The adaptation may be restricted in various ways. For example, adaptation may only be allowed when the operating point is sufficiently close to one of the stored values. In this example, adaptation may not be performed for the observation at 1200 rpm and 75 Nm but may be allowed for operating points within 100 rpm at 2 Nm of one of the stored values. Also, there may be pre-defined bounds outside which adaptation is not performed. For example, in the gearbox loss model, stored values may not be permitted to become negative since actual losses would never be negative. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

During operation of a transmission, there are several operating conditions in which more than one model is available to predict a particular parameter. In such a circumstance, the controller may select one of the estimates as the trusted value. This selection may be based on a priori information about which model tends to be more accurate. The selection may also be based on other criteria such as when the inputs to one model are relatively constant and the inputs to the other model are changing rapidly making the former model more trustworthy. The controller may utilize the trusted value to adapt the less trusted model, making the less trusted model more trustworthy in other circumstances. Alternatively, the controller may select a value that is a weighted average of the multiple estimates, with weighting factors based on the degree of trust of each model. In that case, both models may be subject to adaptation to bring the estimates closer to the selected value. This approach is most useful if each model is also adapted in other circumstances based on independent models. If one model is correct and the other model is inaccurate, the correct model will be re-adapted toward its original prediction in those other circumstances.

Figure 2:
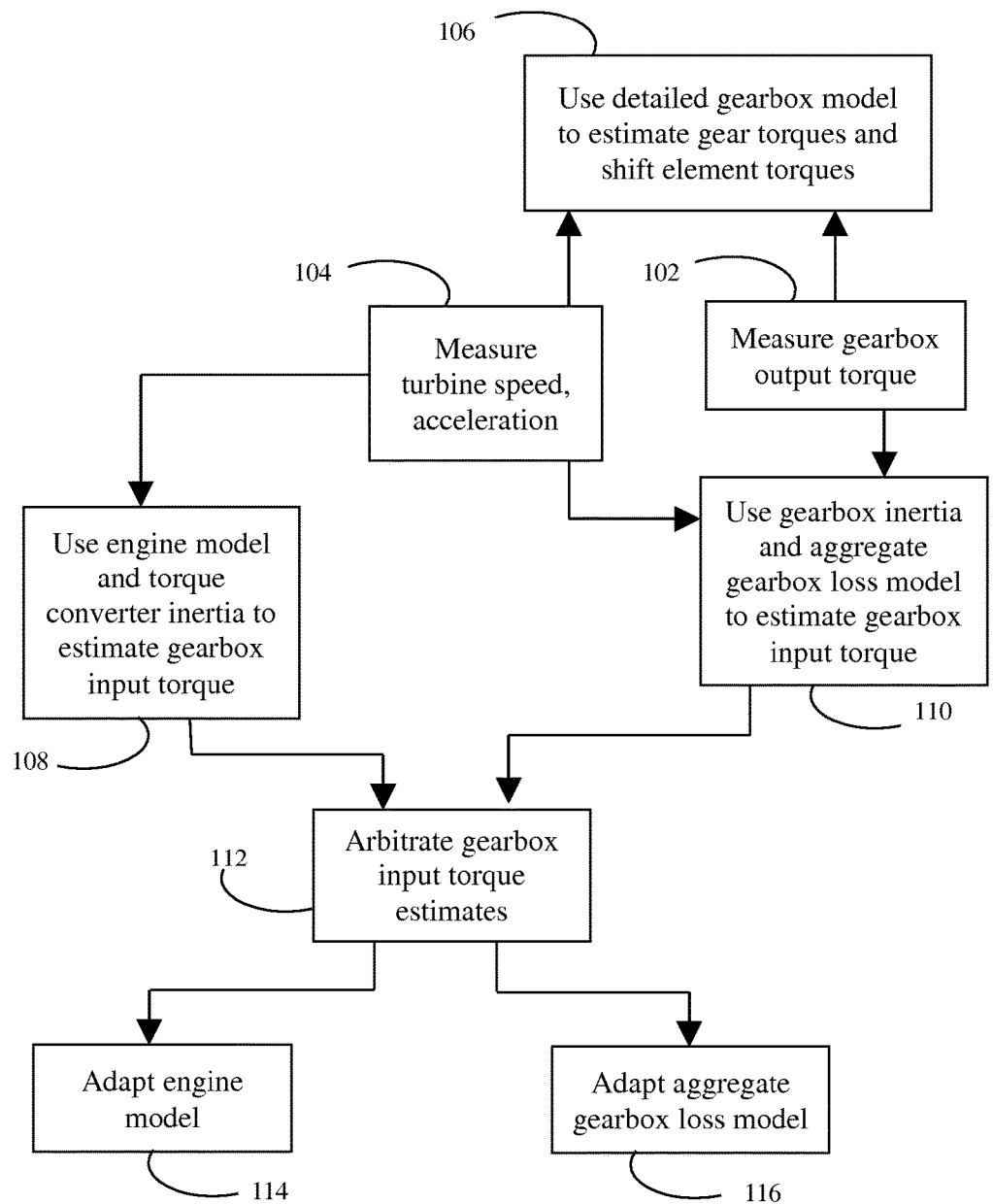
FIG. 2 is a flow chart for operating a transmission in a fixed gear ratio with the torque converter lockup clutch fully engaged.

FIG. 2 illustrates a process for operating a transmission, such as the transmission of FIG. 1, when the torque converter lockup clutch 28 is fully engaged and the transmission is to remain in the current gear ratio. This process is repeated at regular intervals while the transmission remains in this condition. The gearbox output torque is measured at 102 using torque sensor 90, for example. The turbine speed is measured at 104 using speed sensor 86, for example. The acceleration rate of the turbine may be determined by numerically differentiating the turbine speed signal or may be measured by a separate sensor. Since the turbine speed and the engine speed are equal in this operating condition, an engine speed sensor or impeller speed sensor could be used instead of a turbine speed sensor. At 106, a detailed gearbox model is used to estimate the torques of each transmission component of interest, such as gears and shift elements. These torques are proportional to the gearbox output torque measured at 102 corrected for parasitic losses, which may be based on the speed measured at 104, and inertia effects based on the acceleration measured at 104. In this condition, the gearbox input torque is equal to the engine torque after accounting for any torque used to accelerate the torque converter inertia. Therefore, the gearbox input torque may be computed at 108 based on an engine model and the acceleration measured at 104. The gearbox input torque may also be computed at 110 using a gearbox aggregate loss model, the gearbox output torque measured at 102, and correcting for inertia based on the acceleration measured at 104. Since two estimates of gearbox input torque are available, the controller arbitrates between these estimates at 112. For example, the arbitration routine may use a weighted average of the two estimates with the weighting factors based on prior assessments of the trustworthiness of each model. If either model produces a result that is considered unreasonable, the arbitration routine may disregard that estimate and use the other estimate. At 114 and 116, the controller uses the resulting estimate to adapt the engine model and aggregate loss model respectively. In this condition, the controller commands a high pressure to each engaged shift element for the current gear ratio to ensure that the clutches remain fully engaged.

Figure 3:
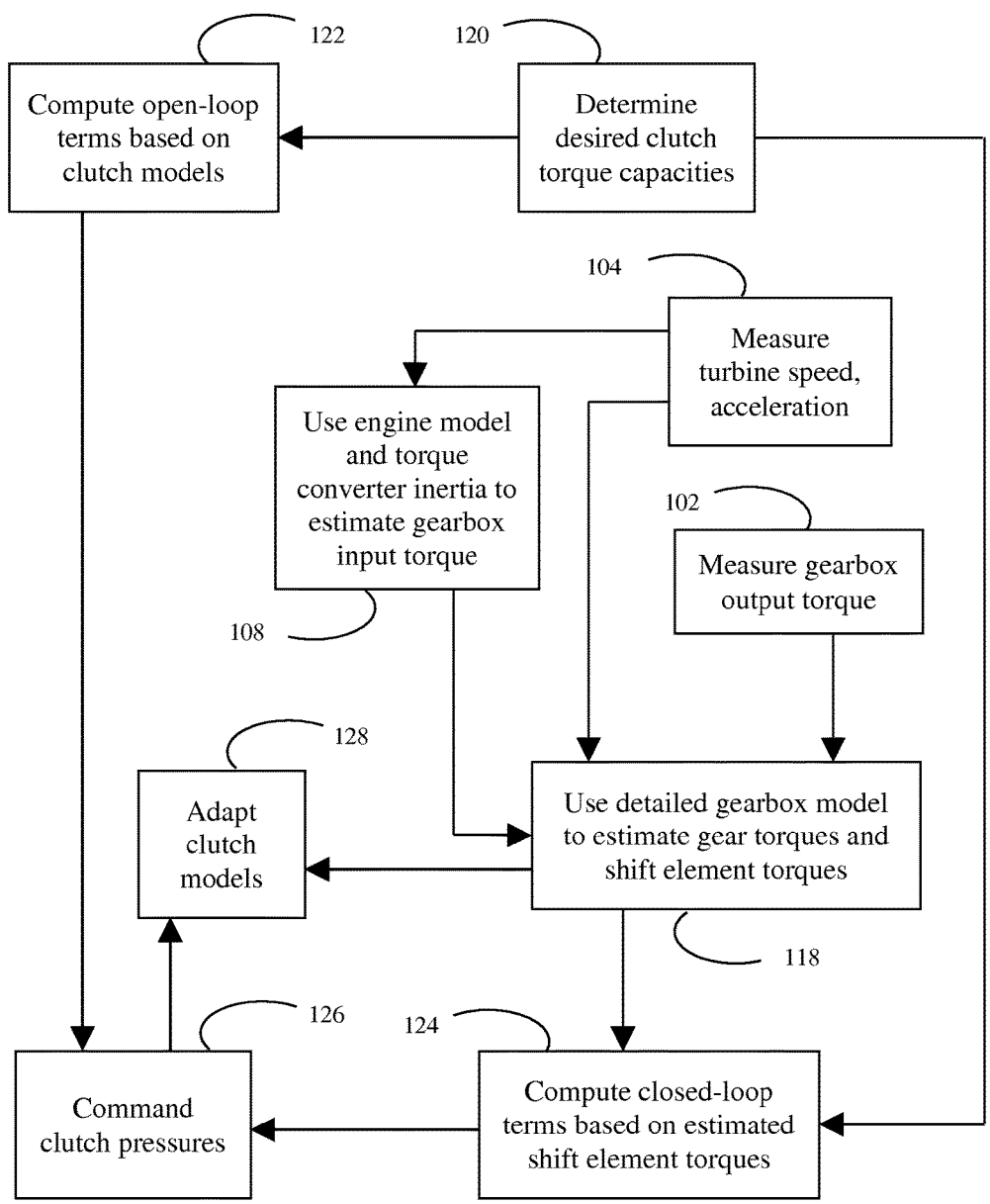
FIG. 3 is a flow chart for shifting a transmission with the torque converter lockup clutch fully engaged.

FIG. 3 illustrates a process for operating a transmission during a shift when the torque converter lockup clutch is fully engaged. This process is repeated at regular intervals during the shift. Steps that are common with FIG. 2 use the same reference number. At 118, the detailed gearbox model is used to estimate the torques of each transmission component of interest, such as gears and shift elements. During the shift, the detailed gearbox model requires two input torque values, so both the measured torque from 102 and the estimated gearbox input torque from 108 are utilized. The desired clutch torque capacities, as required to generate the desired shift feel, are computed at 120. At 122, a clutch model for each clutch is used to calculate the pressure required to produce the desired torque, which is used as an open loop term for clutch pressure control. At 124, the difference between the desired clutch torque capacity and the corresponding estimates from 118 is used to compute closed loop terms. At 126, the control commands a pressure equal to the sum of the open loop term and the closed loop terms. At 128, the commanded pressure from 126 and the estimated shift element torque from 118 may be used to adapt the clutch models, such that future shifts are improved due to reduced reliance on closed loop feedback.

Figure 4:
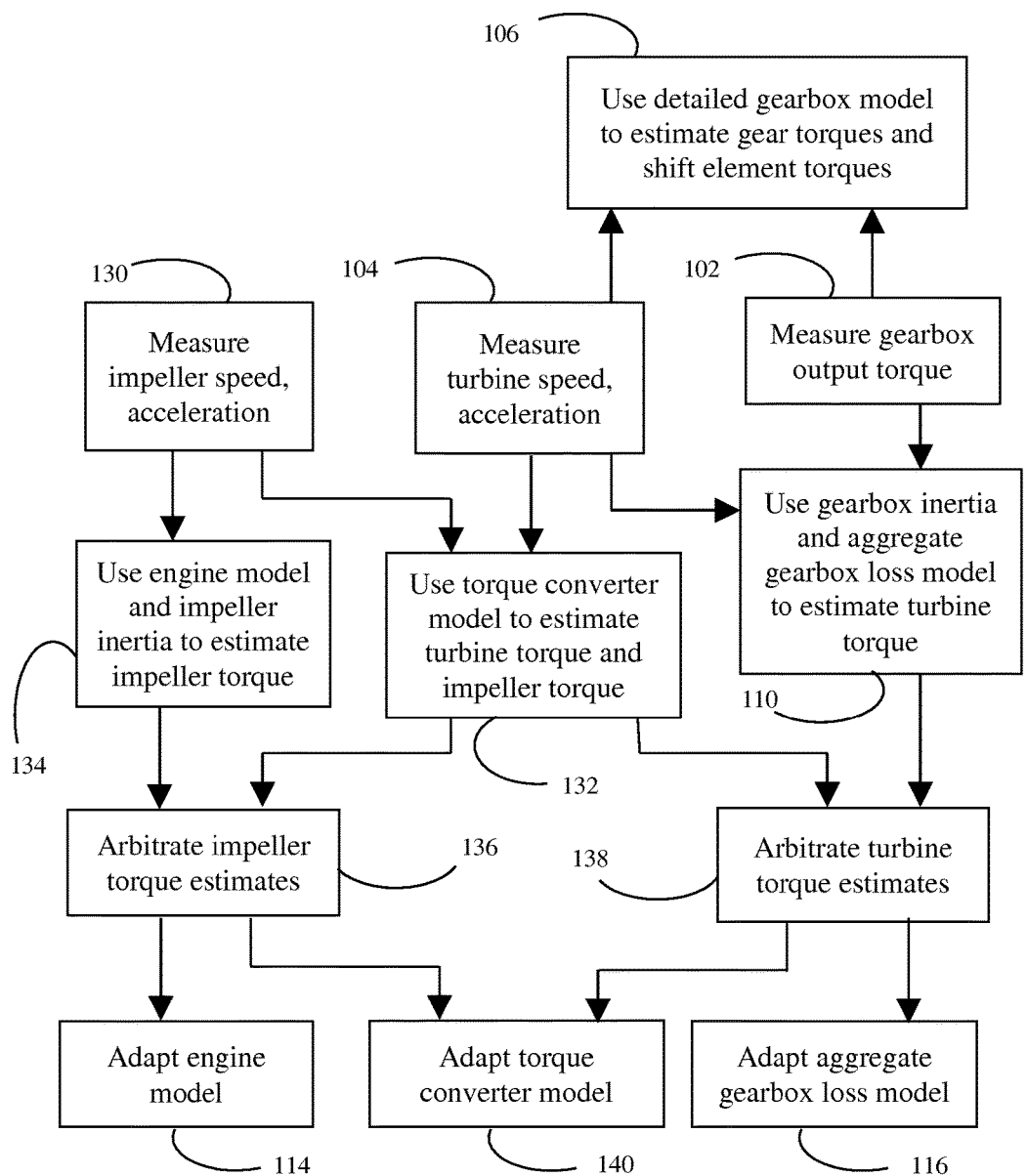
FIG. 4 is a flow chart for operating a transmission in a fixed gear ratio with the torque converter lockup clutch fully disengaged.
Figure 5:
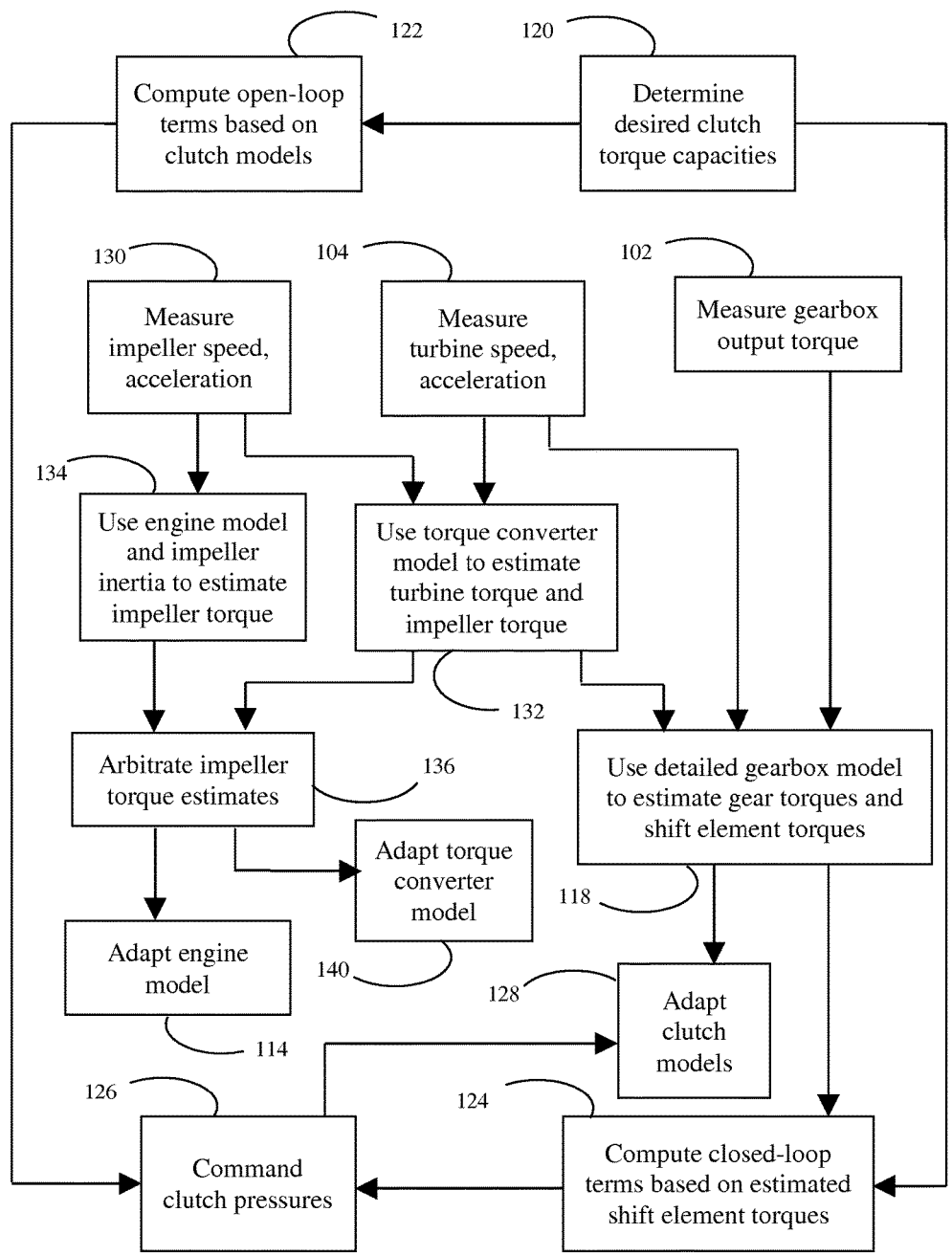
FIG. 5 is a flow chart for shifting a transmission with the torque converter lockup clutch fully disengaged.

FIG. 4 illustrates a process for operating a transmission when the torque converter lockup clutch is fully disengaged and the transmission is to remain in the current gear ratio. This process is repeated at regular intervals while the transmission remains in this condition. As in the process of FIG. 2, a turbine torque estimate is generated at 110 based on measured gearbox output torque, turbine speed, and turbine acceleration, using an aggregate gearbox loss model. Additionally, impeller speed and acceleration are measured at 130. At 132, a torque converter model is used with the measured impeller speed and measured turbine speed to estimate the impeller torque and the turbine torque. At 134, the engine model is used to produce a second estimate of impeller torque. Since there are two estimates of impeller torque and two estimates of turbine torque, arbitration is performed at 136 and 138 to select values. The selected values may be used to adapt the engine model, torque converter model, and aggregate gearbox loss model at 114, 140, and 116 respectively. FIG. 5 illustrates a process for operating the transmission during a shift when the torque converter lockup clutch is fully disengaged. As in the method of FIG. 3, both the turbine torque and the gearbox output torque are used at 118 with the detailed gearbox model to estimate the shift element torques. These shift element torques estimates may be used at 128 to adapt the corresponding clutch models. Since only one turbine torque estimate is produced, only the impeller torque aspect of the torque converter model is adapted at 140.

Figure 6:
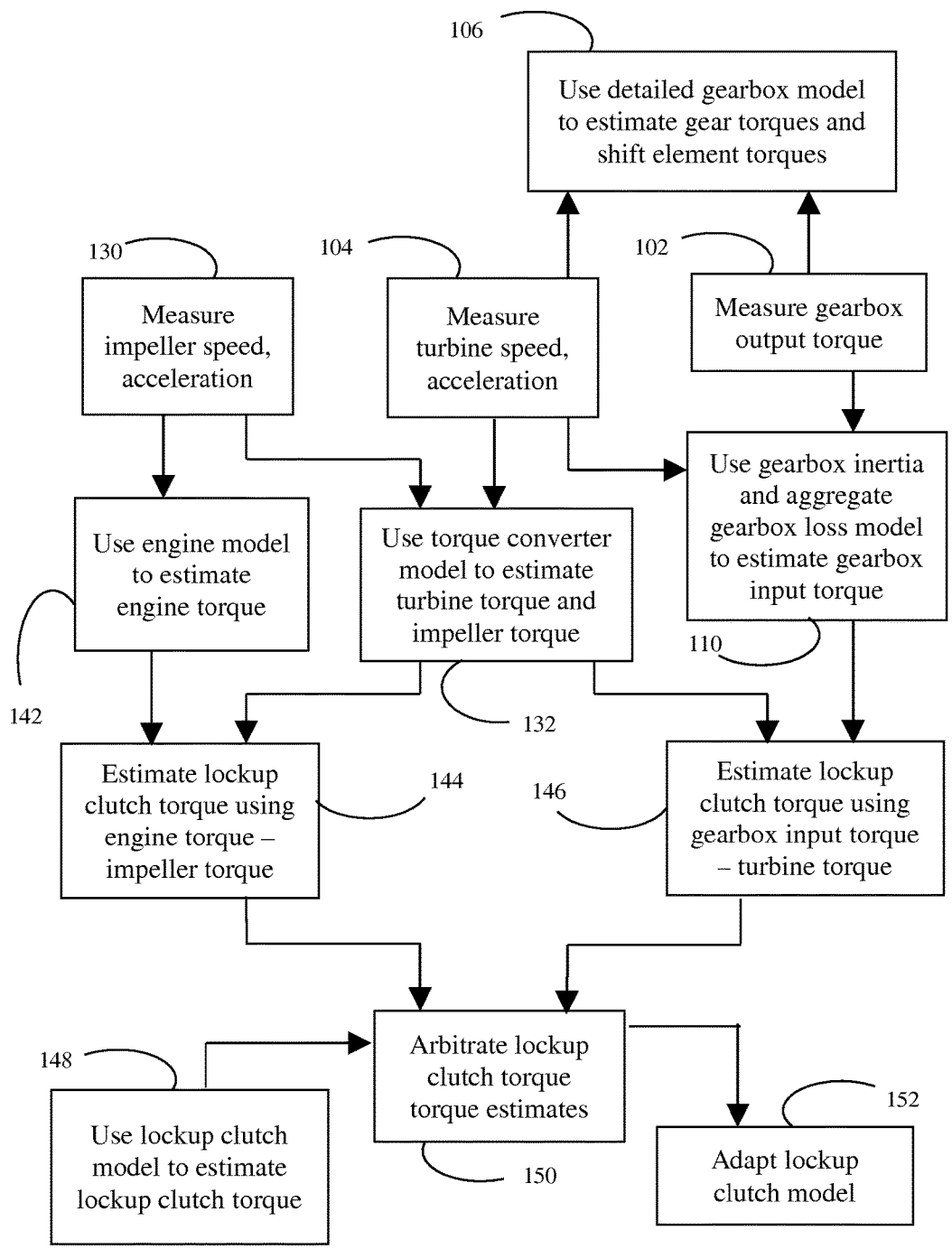
FIG. 6 is a flow chart for operating a transmission in a fixed gear ratio with the torque converter lockup clutch partially engaged.
Figure 7:
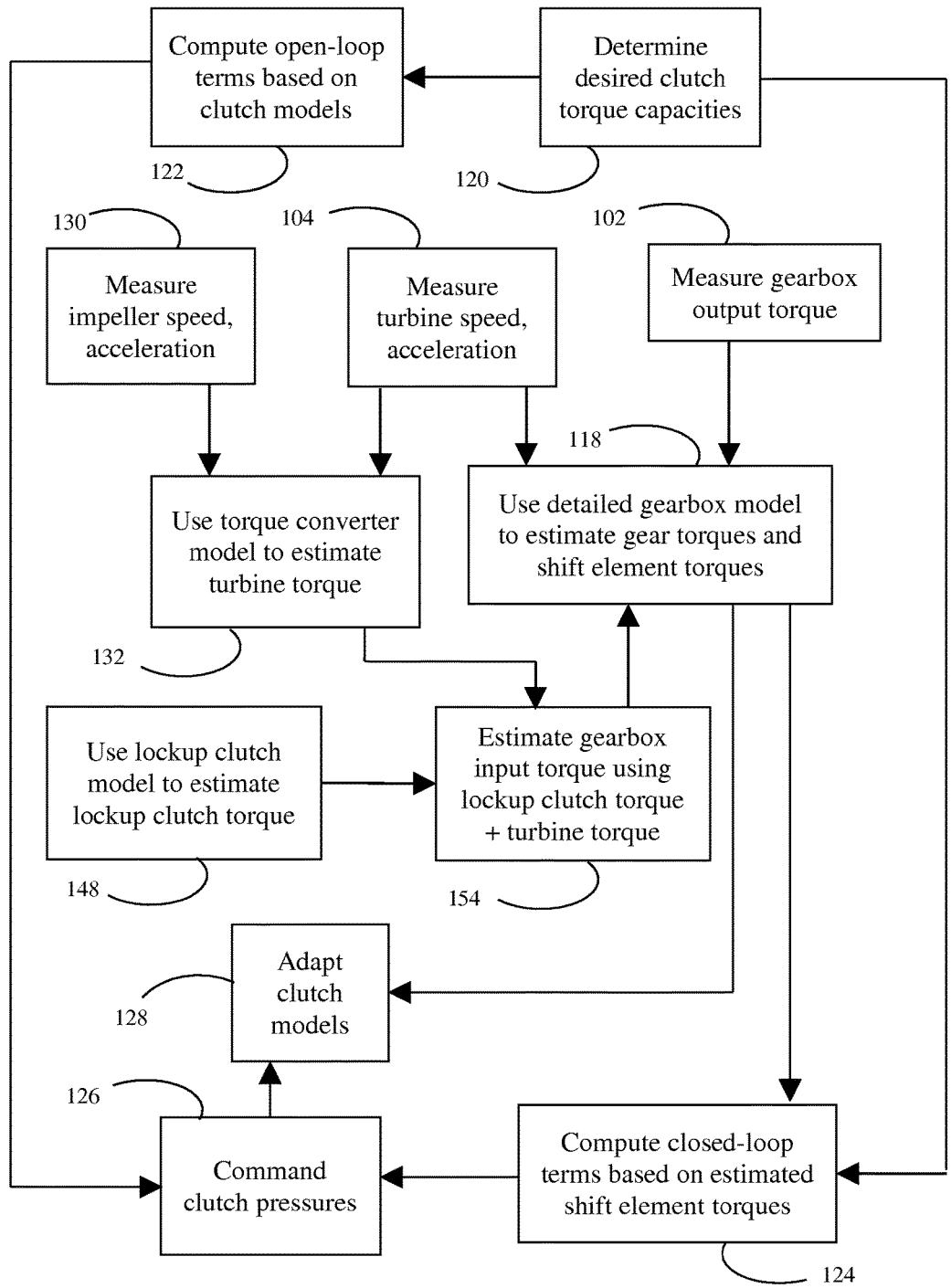
FIG. 7 is a flow chart for shifting a transmission with the torque converter lockup clutch partially engaged.

FIG. 6 illustrates a process for operating a transmission when the torque converter lockup clutch is partially engaged and the transmission is to remain in the current gear ratio. This process is repeated at regular intervals while the transmission remains in this condition. In this condition, the gearbox input torque is the sum of the turbine torque and the lockup clutch torque. Similarly, the engine torque is the sum of the lockup clutch torque and the impeller torque. The gearbox input torque is estimated at 110 based on the measured gearbox output torque and the aggregate loss model. The turbine torque and impeller torque are estimated at estimated at 132 based on measured impeller and turbine speeds. The engine torque is estimated at 142 based on the measured impeller speed, which is equal to the engine speed. The lockup clutch torque is estimated in three ways. At 144, the lockup clutch torque is estimated by subtracting the impeller torque estimate from the engine torque estimate. At 146, the lockup clutch torque is estimated by subtracting the turbine torque estimate from the gearbox input torque estimate. At 148, the lockup clutch torque is estimated using a lockup clutch model. The arbitrated lockup clutch torque estimate produced at 146 is then used to adapt the lockup clutch model at 148. FIG. 7 illustrates a process for shifting the transmission while the lockup clutch is slipping. At 154, the gearbox input torque is estimated by adding the estimated clutch torque produced by the lockup clutch model at 148 to the turbine torque estimate produced at 132.

Figure 8:
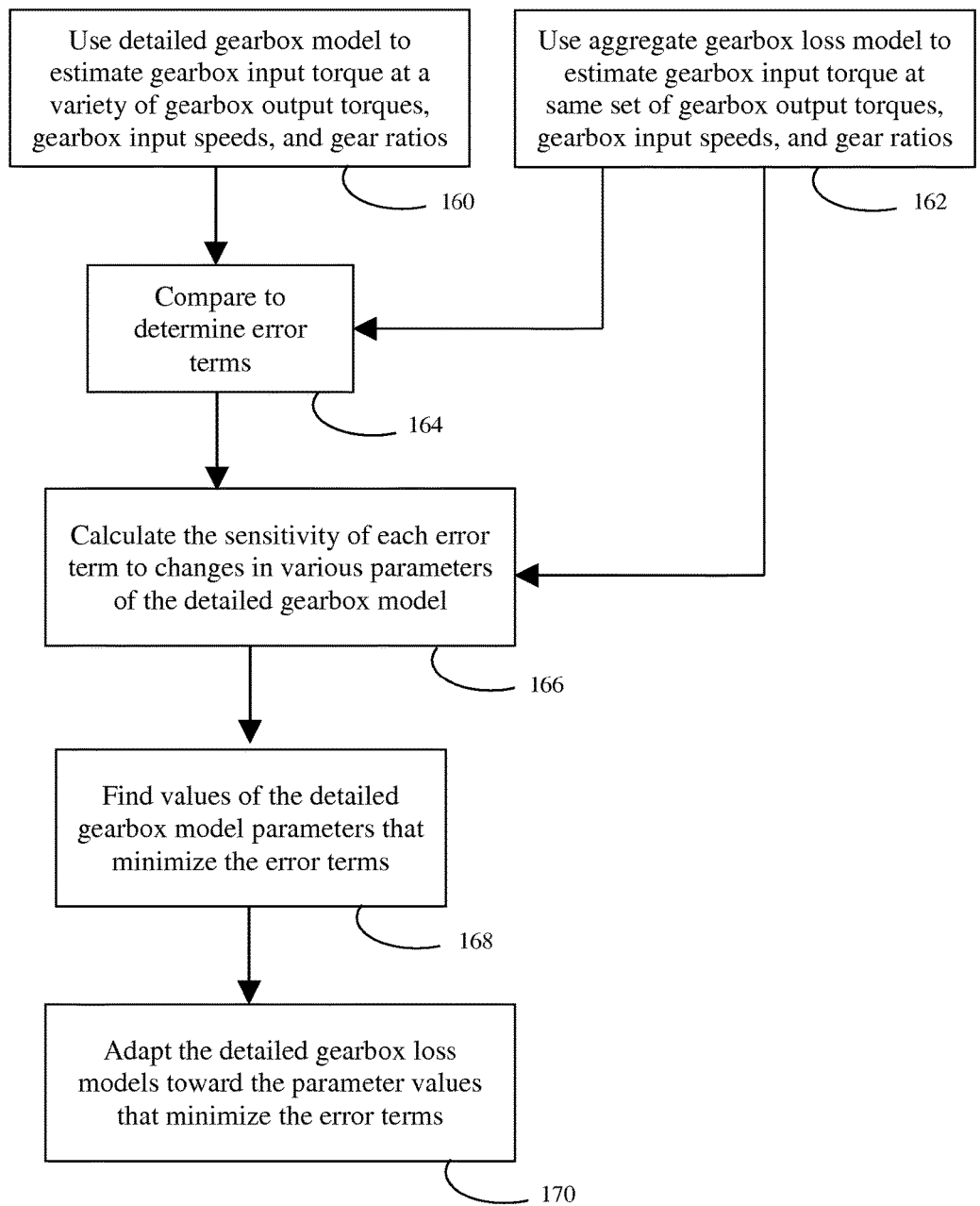
FIG. 8 is a flow chart for adapting a detailed gearbox model based on an aggregate gearbox loss model.

FIG. 8 illustrates a process for adapting the detailed gearbox model. This process is executed much less frequently than the processes of FIGS. 2-7. This process propagates the gradual adaptation of the aggregate gearbox loss model to the detailed gearbox model. Stochastic adaptation may be unsuitable for this because many parameters in the detailed gearbox model may contribute, to varying degrees, to the losses at a particular operating point. A stochastic adaptation algorithm may be unable to determine which parameter to adapt. However, since the relative contribution differs at different operating points, it may be possible to identify which parameter to adjust after observing an appropriate variety of operating points. At 160, the detailed gearbox model is used to estimate the gearbox input torque corresponding to a variety of gearbox output torques, gearbox input speeds, and gear ratios. The collection of output torques, input speeds, and gear ratios may be predetermined or may be derived from the operating points observed since the previous execution of the process. At 162, the aggregate gearbox loss model is used to estimate the gearbox input torque at the same collection of operating points. The values from the two models are compared at 164 to calculate a set of error terms. The number of error terms is equal to the number of operating points considered. At 166, the process computes the sensitivity of each error term to changes in various parameters of the detailed gearbox model. These parameters may be, for example, particular values in lookup tables. Computing the sensitivities may involve repeating the calculations from 160 and 164 with each parameter slightly perturbed from its nominal value. The number of parameters should be equal to or larger than the number of operating points. At 168, revised parameter values that minimize the error terms are computed. This may involve, for example, a least squares curve fit. Finally, at 170, the parameter values are adapted toward the values calculated at 168. To avoid instability, the process may adjust the parameter values to an intermediate value between the original value and the value computed at 168.

Figure 9:
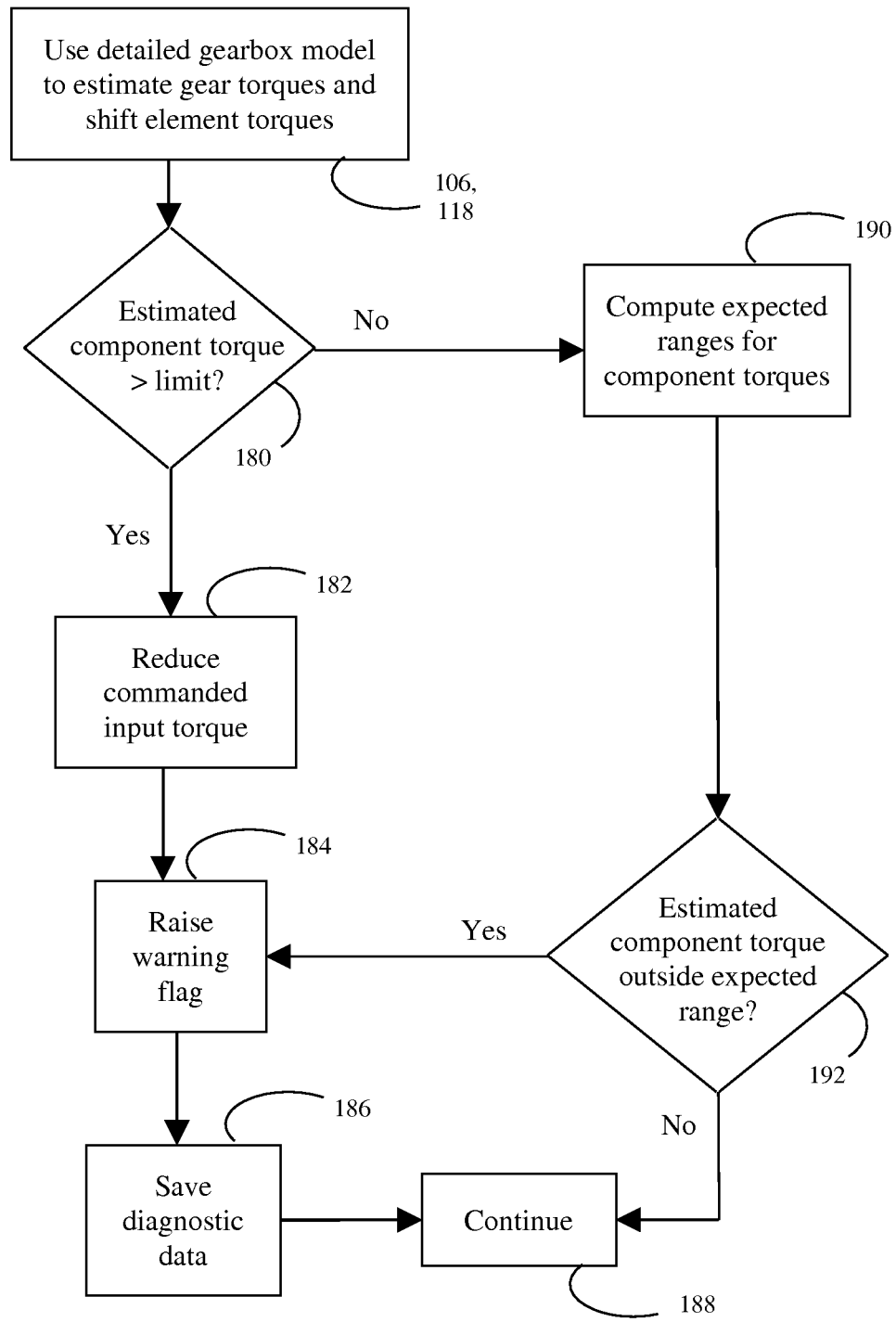
FIG. 9 is a flow chart for detecting and mitigating failures based on estimated component torque values.
Figure 10:
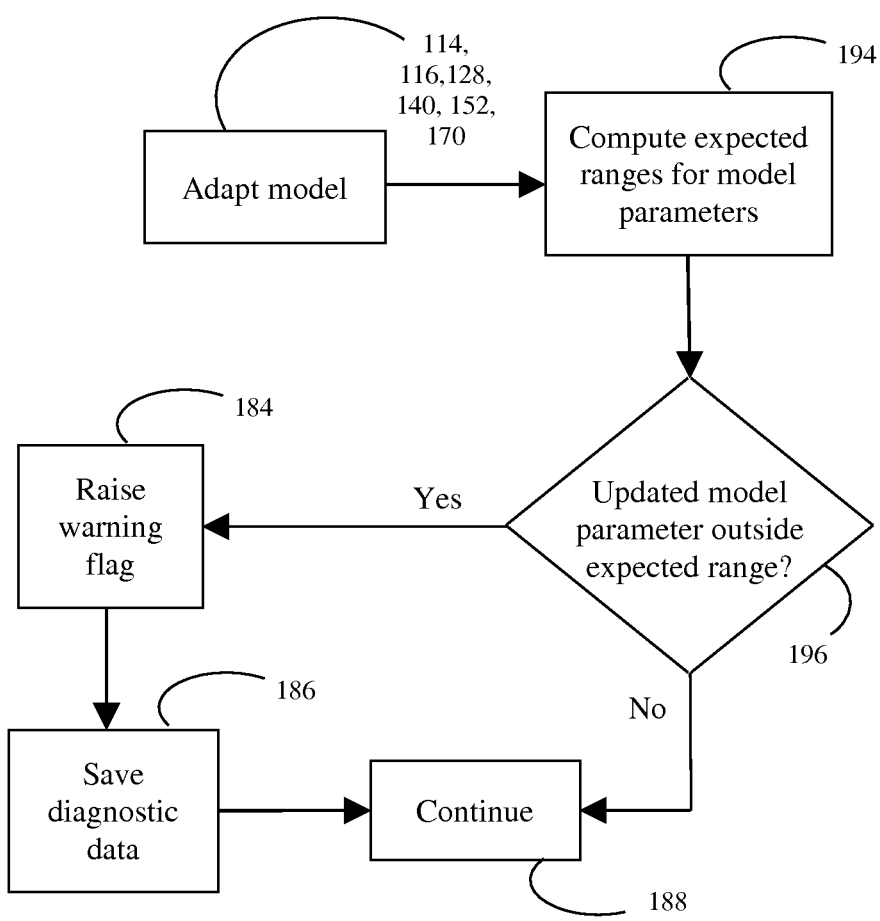
FIG. 10 is a flow chart for detecting failures based on adapted parameter values.

The processes of FIGS. 2-8 provide the ability to compute torque estimates for gears and shift elements within a gearbox based on an output torque sensor, impeller and turbine speed sensors, and a variety of models. The processes also provide the ability to adapt the models such that they accurately represent the current behavior of the system despite part to part variation and component changes over time. FIGS. 9 and 10 illustrate processes which utilize the accurate component torque estimates to detect and mitigate deviations from expected transmission behavior. The process of FIG. 9 starts after the gear and shift element torques are calculated using the detailed gearbox model, which may occur at either 106 or 118 depending on whether the gearbox is in a fixed gear or is shifting. At 180, the component torque estimates are compared to a predetermined torque limit for each component. If the estimated component torque exceeds the limit, then the process reduces the commanded input torque at 182 which generally reduces the torque on all transmission components. Reducing the input torque to keep component torques below the predetermined limit avoids failures caused by over-stressing a component. At 184, a warning flag is raised. This may be accomplished by setting a code in the computer memory that is readable by service personnel. Alternatively, or in addition, a warning light or other indicator may be employed to warn the driver. At 186, the controller stored data about the event to aid future diagnosis. This data may include all relevant component torque estimates, the measured speeds and output torques, any driver commands, and any other data that may be useful to reconstruct the event. At 188, the processes of FIGS. 2-8 continue. If the estimated torque is less than the limit at 180, then the process proceeds to compute expected ranges for each component torque at 190. The range may be predetermined limits or may be a function of other values such as measured output torque, commanded engine torque, etc. At 192, the estimated component torques are compared to the expected ranges. If the estimated component torques are outside the expected ranges, then a warning flag is raised at 184 and diagnostic data is saved at 186.

The process of FIG. 10 starts after a model is adapted in the processes of FIGS. 2-8. At 194, the process computes expected ranges for the updated model parameters. These ranges may be predetermined limits or may be calculated based on factors such as accumulated vehicle mileage. At 196, the revised component parameters are compared to the expected ranges. If the model parameters are outside the expected ranges, then a warning flag is raised at 184 and diagnostic data is saved at 186.

Operation of the failure detection and avoidance mechanisms of the processes of FIGS. 9 and 10 may be best understood via a few illustrative examples. In a first example scenario, a clutch torque fails to achieve the torque capacity for which it was designed. This could occur for a number of reasons. For example, the friction coefficient may be lower than expected due to degradation of the friction material. Alternatively, a blockage in the hydraulic lines or a failed seal may cause the pressure in the clutch apply chamber to be less than the commanded pressure. If the failure occurs over a short period of time, the clutch model will not accurately represent the behavior of the clutch. When this clutch is either an on-coming or off-going element for a shift, it will be controlled according to one of the methods of FIG. 3, 5, or 7. At 122, the controller will compute an open loop pressure command based on the model which results in a torque capacity less than the desired torque capacity. The clutch torque estimate computed at 118 will reflect this lower actual torque capacity. At 190 in the process of FIG. 9, the controller will compute an expected range based on expected variation around the nominal design intent behavior. At 192, the controller will recognize that the estimated clutch torque is outside the expected range and will raise a warning flag at 184 and save diagnostic data at 186. The closed loop terms computed at 124 will partially compensate for the failure by increasing the commanded clutch pressure. Over the course of future shifts, the adaptation of the model at 128 will increase the open loops terms computed at 122 to better compensate. If the failure occurs gradually over an extended period of time, gradual adaptation of the model at 128 will compensate for the failure by increasing the open loop commanded clutch pressure. Specifically, values in the table relating clutch torque capacity to commanded clutch pressure will gradually be reduced. The process of FIG. 10 will detect the failure when the table values are adapted to values below the expected range. Consequently, a flag will be raised and diagnostic data will be saved.

As a second example, a clutch may not fully release when the commanded pressure is reduced to zero. This could happen, for example, due to contamination between the clutch plates or due to contamination preventing the piston from sliding to the disengaged position. During a shift for which the clutch in question is the off-going element, the clutch torque is computed at 118 of the process of FIG. 3, 5, or 7. At 190 of the process of FIG. 9, the expected range for the clutch torque at the completion of the torque transfer phase would be based on the anticipated drag torque for this clutch. When the torque is outside of this range, as determined at 192, a warning flag is raised at 184 and diagnostic data is saved at 186. If the failure occurs gradually, it would be reflected in clutch model via adaptation at 128 of FIG. 3, 5, or 7, in the aggregate gearbox loss model via adaptation at 116 of FIG. 2, 4, or 6, and in the detailed gearbox model via adaptation at 170 of FIG. 8. Once the failure gets sufficiently severe, one or more of these adaptations would trigger a warning flag and saving of diagnostic data in the process of FIG. 10.

As a third example, the engine may produce more torque than commanded. This could happen, for example, due to a poorly calibrated throttle actuator or installation of an aftermarket engine control computer chip. The engine model will be adapted at 114 of FIG. 2, 4, or 5, which may result in a warning flag in the process of FIG. 10. However, even if the engine model is accurate, the higher engine torque may result in excessive torque on transmission components. If the component torques are high enough to cause damage, this is detected at 180 in the process of FIG. 9. In response, the controller reduces the commanded input torque at 182 to protect the components.

The availability of speed and torque estimates for all gears and shift elements during the entire time of operation enables additional failure detection and avoidance features. For example, information about the transmitted torque of a clutch and slip speed across the clutch enables computation of the power dissipated by the clutch. Integrating the dissipated power permits calculation of the energy absorbed during a shift or other maneuver. If the energy exceeds an acceptable level, the controller may respond by decreasing the input torque or by shortening the shift duration. If the heat dissipation characteristics of the clutch are also modeled, the clutch model can predict clutch temperature, which can in turn be used to adjust the estimate of torque capacity based on pressure. When the clutch temperature is above some threshold, the control strategy may inhibit shifts involving that clutch or execute the shifts in a modified way to reduce further clutch heating. Some components may exhibit wear that can be predicted based on load history. For this purpose, load may include torque, speed, temperature, and any other quantity measured or estimated by the controller. The controller may monitor the load history and maintain an estimate of the remaining useful life of the component. When the estimated remaining useful life falls below a threshold, the controller may set a warning flag or otherwise inform the driver or mechanic to consider replacing the component.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of operating a transmission comprising:
   during a shift event, measuring a gearbox output torque, estimating a gearbox input torque using a first model, and estimating a torque of a component based on the output torque measurement and the input torque estimate using a second model; and
   in response to the estimated torque of the component being outside an expected range, setting an error flag readable by service personnel.

2. The method of claim 1 further comprising, in response to the estimated torque of the component being outside the expected range, saving diagnostic data.

3. The method of claim 1 further comprising, in response to the estimated torque of the component exceeding a component torque limit, reducing a commanded transmission input torque.

4. The method of claim 1 further comprising calculating the expected range based on a measured, estimated, or commanded torque value.

5. The method of claim 1 wherein the expected range is predetermined.

6. The method of claim 1 wherein the component is a gear.

7. The method of claim 1 wherein the component is a shift element.

8. The method of claim 7 wherein the shift element selectively couples two shafts, neither of the shafts being a gearbox input shaft nor an output shaft.

9. The method of claim 1 wherein the first model is an engine model and the second model is a gearbox model based on torque relationships for gears and shift elements.

10. The method of claim 1 wherein the first model is a torque converter model and the second model is a gearbox model based on torque relationships for gears and shift elements.

11. A method of operating a transmission comprising:
    while operating with a fixed gearbox ratio, calculating first and second estimates of a transmission component torque using first and second models respectively;
    in response to the first estimate differing from the second estimate, adapting a parameter of the first model; and
    in response to the parameter being outside a predetermined range, setting an error flag readable by service personnel.

12. The method of claim 11 further comprising, in response to the parameter being outside the predetermined range, saving diagnostic data.

13. The method of claim 11 wherein the transmission component torque is a gearbox input torque, the first model is an engine model, and the second model is a gearbox loss model.

14. The method of claim 11 wherein the transmission component torque is a gearbox input torque, the first model is a gearbox loss model, and the second model is an engine model.

15. The method of claim 11 wherein the transmission component torque is an impeller torque, the first model is an engine model, and the second model is a torque converter model.

16. The method of claim 11 wherein the transmission component torque is an impeller torque, the first model is a torque converter model, and the second model is an engine model.

17. The method of claim 11 wherein the transmission component torque is a turbine torque, the first model is a torque converter model, and the second model is a gearbox model based on torque relationships for gears and shift elements.

18. The method of claim 11 wherein the transmission component torque is a turbine torque, the first model is a gearbox model based on torque relationships for gears and shift elements, and the second model is a torque converter model.

19. The method of claim 11 wherein the transmission component torque is a torque converter lockup clutch torque, and the first model is a clutch model relating torque capacity to commanded pressure.

20. A method of operating a transmission comprising:
    between shift events, adapting an aggregate gearbox loss model using first values of an output torque and of a gearbox input torque;
    during shift events, estimating gearbox component torques using second values of the output torque and the gearbox input torque and a detailed gearbox model based on torque relationships for gears and shift elements; and
    adapting the detailed gearbox model using the aggregate gearbox loss model.

21. The method of claim 20 further comprising, in response to a parameter of the detailed gearbox model being outside a predetermined range as a result of the adaptation, setting an error flag readable by service personnel.

22. The method of claim 20 further comprising measuring the output torque.

23. The method of claim 20 further comprising estimating the input torque using a third model.

* * * * *